June 10, 1952  M. C. POTTER  2,600,320
TWO-POWER ELECTRIC LOCOMOTIVE
Filed Sept. 15, 1950
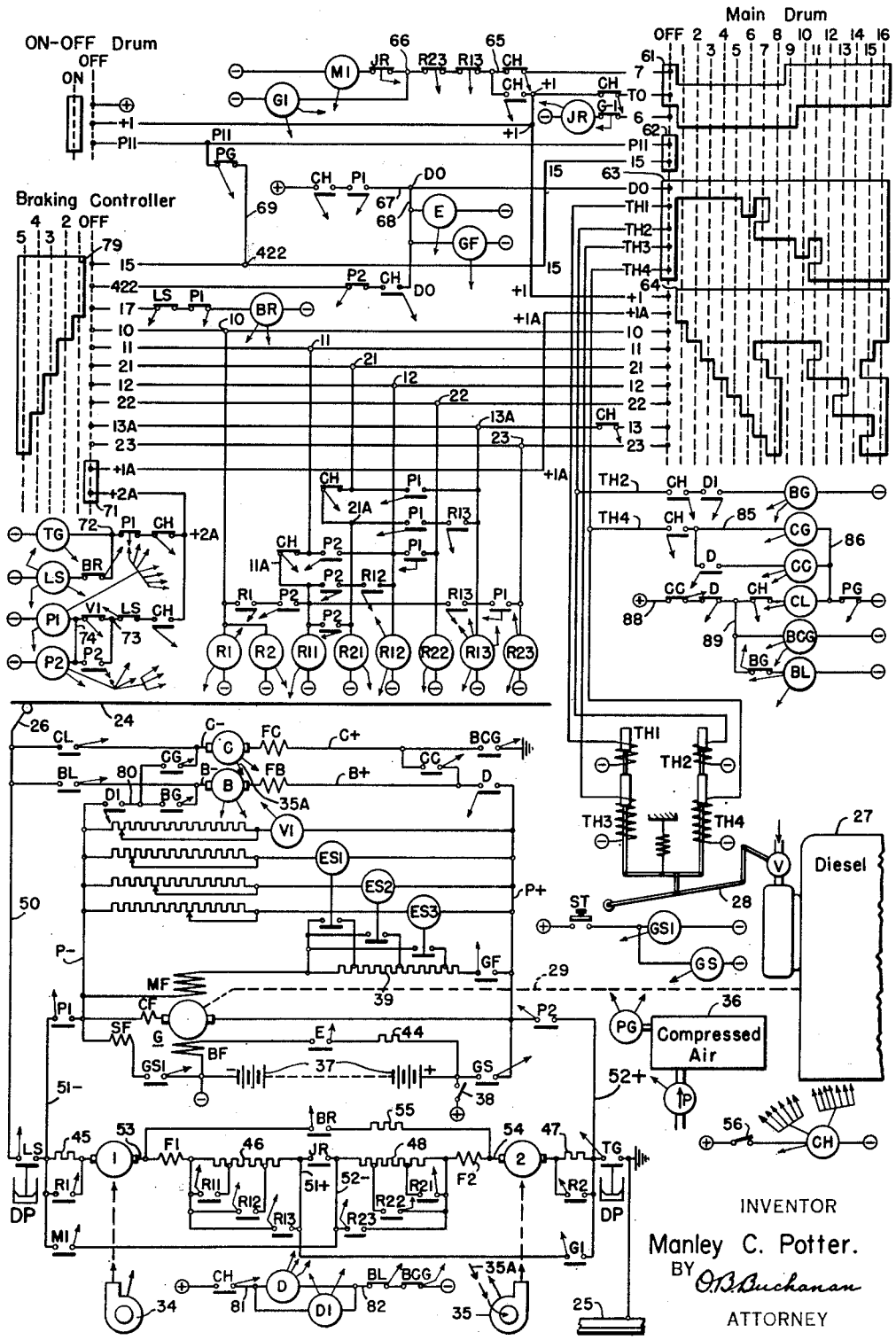
INVENTOR
Manley C. Potter.
BY O.B. Buchanan
ATTORNEY Patented June 10, 1952

2,600,320

UNITED STATES PATENT OFFICE 2,600,320

TWO-POWER ELECTRIC LOCOMOTIVE

Manley C. Potter, Turtle Creek, Pa., assignor to Westinghouse Electric Corporation, East Pittsburgh, Pa., a corporation of Pennsylvania Application September 15, 1950, Serial No. 185,066

16 Claims. (Cl. 105—61)

My invention relates to two-power self-propelled electric vehicles or locomotives, such as a combination trolley and diesel-electric locomotive, with or without dynamic braking.

In such locomotives, it is always necessary to maintain a compressed-air supply, for operating brakes, pneumatic switches and other well-known equipment. During operation from a trolley or other external electrical power-supply line, it is necessary to use a trolley-energized electric compressor-motor for driving the pump or compressor for the compressed-air tank. In most cases, this means, for practical purposes, that the compressed-air pump shall be driven by the same compressor-motor during diesel-operation.

A characteristic of diesel-electric locomotives, however, is that the diesel or other engine is driven at controlled variable speeds, for driving an electric generator which supplies variable-voltage power to the traction-motors, so that the speed of the traction-motors is normally controlled by engine-throttle control, rather than by means of series-parallel transitions for the use of accelerating-resistances in series with the traction-motors. This means, in general, that there is not sufficient voltage to satisfactorily drive the compressor-motor from the diesel-driven generator when the latter is operating at its idling-speed.

In previous combination trolley and diesel-electric locomotives, the continued attention of the operator has been needed, in order to maintain the air-pressure necessary for braking, when the locomotive is operated from diesel power, without trolley connection, because electric power for operating the compressor-motor would not be available if the locomotive were left standing unattended for any considerable length of time.

It is an important object of my present invention to provide a control-scheme which will automatically insure that air-pressure is maintained at all times, thus contributing materially to the safety of combination trolley and diesel-electric locomotives in which the mechanical energy for driving the compressed-air pump is obtained by means of an electric compressor-motor.

In practically all cases, the traction-motors for electric locomotives are of a type requiring artificial cooling during certain heavy-duty conditions. For supplying such cooling, a blower is needed, and on combination or two-power locomotives a blower-motor is required for driving this blower.

In many, if not most, electric locomotives, dynamic braking is desired, so that the traction-motor or motors can be used for braking the locomotive. If heavy dynamic braking should be used for any considerable time, as on a long grade, the traction-motors would soon burn out, unless some way could be found to maintain a suitable electric power-supply for the blower-motor or motors. During trolley-operation, such power is always available from the trolley-wire. During diesel-electric operation, however, a sufficient voltage for suitably energizing the blower-motors during dynamic braking is not available if the engine is running at its idling-speed.

An important object of my present invention is, therefore, to automatically provide adequate power for the blower-motors when dynamic braking is used during diesel-operation.

In accordance with a preferred form of embodiment of my invention, the main controller is provided, at its off-position, with an engine-accelerating contact which stands ready, when energized, to accelerate the engine when the generator is running (or has been running) at its idling-speed (or the idling-speed of the engine), as the power-supply in use at the moment. This engine-accelerating contact is then automatically energized, either when the pressure-gauge, compressor-governor, or pressure-operated switch on the compressed-air tank calls for more air-pressure, on when the braking controller is moved to its first braking-position or to any other braking-position in which the overheating of the traction-motors might be involved.

This mode of operation of the diesel power-plant, whenever compressor-motor power is required, creates a hazard when traction-power is required while the compressed-air pump is being operated during diesel-operation. As soon as the main controller is moved from its off-position to its first on-position, for energizing the traction-motors from the diesel-operated generator, the engine-accelerating contact will be disconnected, so that the engine will be slowed down, but this slowing down of the engine obviously requires time, and if the traction-motors were connected directly across the diesel-driven generator with the locomotive at standstill, and with the diesel-engine operating at a high speed, an intolerable surge of power would be delivered to the traction-motors, which would strip the gears and cause other serious damage to the train and to the personnel. It is necessary, therefore, to install an undervoltage relay, or other device which is responsive to a suitable reduction in the engine-speed, in order to deenergize the first on-position contactor-points of the main controller, during diesel operation, when the engine has been operating at a high speed for compressor-operation.

It would be possible, of course, to make this engine-speed relay delay the energization of the first main-controller point until the engine-speed had dropped to its normal low-speed for that point, at which time the traction-motors could be connected directly across the generator-terminals without any serially connected accelerating-resistance, as is the normal condition for diesel-operation. Such a procedure, however, would cause an appreciable time-delay, in the application of traction-motor power after the operator has moved his handle to the first controller-position for normal diesel-operation of the traction-motors.

It is a further object of my present invention, however, to use the accelerating resistors, which are always used for trolley-operation, as a cushion during diesel-operation. Under this plan, the master controller is so arranged that, during diesel-operation, the first few on-position points of the controller will successively cut out the accelerating-resistors, and then, with all of the accelerating-resistors cut out, and with the traction-motors directly connected across the diesel-driven generator, the tractive effort which is applied to the locomotive will be subsequently increased by advancing the engine-throttle during the further movement of the controller-handle. During normal diesel-operation, with the diesel-engine starting from its idling speed, the first few resistor-varying on-positions of the master controller will not produce any material tractive effort, and will be quickly passed over by the operator, until the first running position is reached, with the accelerating-resistance all out, after which the operation will move the controller-handle slowly for the normal acceleration of the train.

During compressor-operating conditions, however, when the compressor has been operating with the engine-accelerating contact in service, on the off-position of the master controller, it is not now necessary to make the engine-speed reduce substantially to its idling-speed, before the traction-motors can be connected to the engine-driven generator, because some or all of the accelerating-resistance is now in series with the traction-motors, during the first few points of the controller-position. In accordance with my present invention, therefore, I set the undervoltage relay, or other engine-speed relay, so as to energize the on-position controller-points as soon as the engine-speed or the generator-voltage drops to some intermediate value, which will give satisfactory starting-conditions during diesel-operation, in this manner the time-delay, for allowing time for engine-deceleration, is reduced, in an exemplary case, to something like three-quarters of a second, which is an almost inappreciable amount of time.

When the diesel power-plant is operating at a high speed, during compressor-operation with the main controller-handle in its off-position, enough noise is made so that the operator is fully aware of this circumstance, so that, when he moves his main controller-handle, under such circumstances, he will know not to pass quickly over the first few resistor-varying on-positions of the controller-drum, but will pause, or move slowly, over an early resistor-varying drum-position, so that the diesel-driven generator will first apply the locomotive-starting tractive effort with the abnormally high generator-voltage compensated for by the serially-connected accelerating-resistance in series with the traction-motors. In this way, an appreciable amount of power is withdrawn from the generator, which will practically instantly reduce its speed to its idling-speed, after which normal control-drum manipulation may be used, as in ordinary diesel-operation.

Other objects of my invention will be apparent from the detailed description and claims, and from the accompanying drawing, wherein the single figure is a much simplified diagrammatic view of circuits and apparatus illustrating the principles of my invention, without showing irrelevant or non-cooperative features such as a reversing drum, a large number of traction-motors connected first all in series, then in a series-parallel connection, and finally in a parallel connection, during trolley-operation, various pantograph-control and other interlocks, battery-charging controls, over-current lockouts, and many other features which make up a complicated locomotive control-system, as is well understood in the art, but not necessary, here, to an understanding of the essential novel principles of my invention.

The accompanying drawing is a schematic, or "across the line" diagram, so far as practicable. The various mechanical connections between separated parts are indicated by arrows or dotted lines. Each relay, contactor, or electrically operated or controlled switching-device (these terms being herein used interchangeably), is indicated by a separate letter-designation or legend, which is applied to the operating-coil and to all of the contacts of the relay, as a further convention for symbolically tying the various relay-parts together. All relays and switches are shown in the deenergized position. In most cases, the letters or numerals which designate the various control-circuits are similar or identical to the designation of the relays which are controlled thereby, so as to be at least suggestive of the purposes of the several circuits.

The main circuits are shown in the bottom half of the drawing. The illustrated apparatus is for a railway system, a portion of the trackage of which is equipped with a trolley-wire 24 which is intended to be representative of any external electrical power-supply line, such as a trolley, a third-rail, or a gathering-reel. The trolley-wire 24, in this case, happens to be the negative terminal of a direct-current supply system, the positive terminal of which is grounded on the running-rail 25 which is shown at the bottom of the drawing. The trolley-wire 24 is engaged by a trolley-pole or pantograph 26, which is intended to be representative of any suitable collecting-device, or connection-means which is adapted to energize the locomotive or other self-propelled electric vehicle from an external electric power-supply line, when such a line is available.

The drawing is a diagrammatic illustration of a combination-power or two-power locomotive, which carries an auxiliary electric power plant for use when the trolley-line 24 is not available. As shown at the lower right-hand side of the drawing, the locomotive carries a diesel engine 27, which is intended to be representative of any kind of vehicle-borne variable-speed engine. The engine is provided with a throttle-valve V, which has an automatic electric control which is shown in the form of a linkage 28 which is operated to successively advanced throttle-opening positions by means of four throttle-controlling coils or solenoids TH1, TH2, TH3 and TH4, which are operated in certain combinations to adjust the throttle-valve V to any position between its idling-speed adjustment and its full-throttle adjustment. The diesel engine 27 has a drive-shaft connection 29 to a generator G.

A simplified type of locomotive is illustrated, having only two traction-motors, which are shown underneath the generator G, and which are designated by the numerals 1 and 2, respectively. These traction-motors drive the drive-wheels (not shown) of the locomotive.

The traction-motors 1 and 2 are cooled by means of blowers 34 and 35, which are driven by means of a blower-motor B. One of the blowers, such as 35, might draw its intake-air over the compressor-motor C, to ventilate the latter, as indicated by the dotted arrows 35A.

As shown on the drawing near the diesel engine 27, the locomotive is provided with a compressed-air tank 36, which is equipped with a pressure-operated switch or pressure-governor, hereinafter called by the generic term, pressure-gauge, PG, which is provided with two back-contacts PG, which will be referred to in their proper place in the subsequent description of the circuits, these contacts being closed at a predetermined low-pressure point, and being opened when the pressure exceeds a predetermined value. Compressed air is supplied to the tank 36 by means of a pump or compressor P, which is driven by the compressor-motor C.

As shown below the generator G, the locomotive is also equipped with a storage-battery 37, the negative end of which is connected to a negative bus (—), while the positive battery terminal is connected, through a switch 38, to a positive bus (+).

The illustrated generator G is provided with two shunt-type fields MF and BF, and two serially connected fields CF and SF. The first shunt-type field MF is a main field, which is self-energized across the generator-terminals P— and P+, through the make-contact of a generator-field contactor GF, and through a variable field-resistance 39. The second shunt-type field BF is a small battery-energized field, which is connected across the battery-terminals through the make-contact of a contactor E, and also through a resistance 44. The first series field CF is a commutating field, which is shown as being connected between the negative generator-terminal P— and the generator-armature. The second series field SF is a starting-field, which serves a series field for using the generator G as a series motor when the generator is used as a starter for the diesel engine 27, said starting-field SF being energized for this purpose from the battery 37, through the two make-contacts GS and GS1 of two generator-start contactors GS and GS1, respectively.

The illustrated generator G is a direct-current generator, having a full-speed voltage which is somewhat less than the voltage of the trolley-wire 24. The voltage of the generator G is adjusted so that it increases considerably faster than the speed, as the speed of the diesel engine 27 is gradually increased from its idling-speed to its full-throttle speed, this effect being obtained or enhanced by means of three overvoltage relays ES1, ES2 and ES3, which respond to successively higher values of the generator-voltage, and which short out successively larger portions of the field-resistance 39, so as to strengthen the main-field excitation, as the generator-voltage increases. These overvoltage relays ES1, ES2 and ES3 are representative, of course, of any engine-speed-responsive devices. They make the generator-output more nearly responsive to the power-output capacity of the diesel engine 27, at all speeds.

The two traction-motors 1 and 2 are series, direct-current motors, having series fields F1 and F2, respectively, and having serially connected accelerating-resistances 45 and 46 for the motor 1, and 47 and 48 for the motor 2. The accelerating-resistances 45 and 47 are cut out by means of shunt-connected make-contacts R1 and R2, respectively, of correspondingly numbered relays R1 and R2. The other two accelerating-resistances 46 and 48 are cut out in steps, by contactors R11, R12, R13 and contactors R21, R22, R23, respectively.

The compressor-motor C and the blower-motor B are direct-current series-motors, having series fields FC and FB, respectively. These motors are shown as having a voltage suitable for direct-starting across the trolley-voltage. Their voltage-rating is so much higher than the idling-speed generator-voltage, that these motors will not operate satisfactorily from the generator G, during diesel-operation when the trolley-supply is not available, unless the diesel engine 27 is accelerated to some speed which is considerably higher than its idling-speed.

During trolley-operation, the trolley-pole 26 energizes the trolley-line 50, which is connected, through a line-switch LS, to the negative terminal 51— of the traction-motor No. 1. The positive terminal 51+ of this motor is at first connected, by means of a series or transition-switch JR, to the negative terminal 52— of the traction-motor No. 2. The positive terminal 52+ of this second traction-motor 2 is connected to the ground or rail 25, through a trolley-switch relay TG.

The series-connection traction-motor circuit can now be traced from the trolley-line 50, through the line-switch contact LS, the negative No. 1 motor-terminal 51—, the accelerating-resistor 45, the No. 1 motor-armature, a No. 1 armature-to-field conductor 53, the No. 1 field-winding F1, the accelerating-resistor 46, the No. 1 motor-terminal 51+, the transition or series-switch JR, the No. 2 motor-terminal 52—, the accelerating-resistor 48, to the No. 2 field-winding F2, a No. 2 armature-to-field conductor 54, the No. 2 armature, the accelerating-resistor 47, the No. 2 motor-terminal 52+, and the trolley-ground switch TG, to the rail 25.

Any suitable control-system can be used for the traction-motors 1 and 2. In the illustrated system, the first trolley-operation is with the two motors 1 and 2 in series. After the various accelerating-resistances have been successively cut out, the two traction-motors 1 and 2 will then be connected directly in series across the trolley voltage, without any resistance in series with them. For still higher speeds, parallel operation is obtained, in which the sequence of cutting out the starting or accelerating-resistances in steps is repeated all over again.

The illustrated trolley-operation motor-control system uses a well-known transition-step wherein the accelerating-resistances 46 and 48 are first restored to service. The dropping out of the resistance-shorting contactors R13 and R23 automatically energizes a ground-side multi- I also provide for the use of the two traction-motors 1 and 2 to produce dynamic braking, by means of a braking-switch contact BR which is connected, through a braking-resistor 55, across the conductors 53 and 54. The braking circuit is completed by the closure of the two multiple-motor switches M1 and G1, leaving the other circuit-connection switches open, namely LS, JR, TG, P1 and P2. The intensity of the braking-action is controlled by varying the accelerating-resistances 45 to 48, in a known manner.

The motoring and braking operations are summarized in Tables I and II as follows:

*Table I*

| Main-Drum Points | Trolley-Operation | | | | | | | | | | | Diesel-Operation | | | | | | | | | |
|---|---|---|---|---|---|---|---|---|---|---|---|---|---|---|---|---|---|---|---|---|---|
| | LS TG | M1 | G1 | JR | R1 R2 | R 11 | R 12 | R 13 | R 21 | R 22 | R 23 | GF E | M1 G1 | P1 P2 | R1 R2 | R 11 | R 12 | R 13 | R 21 | R 22 | R 23 |
| Off | | o | o | | | | | | | | | o | o | | | | | | | | |
| 1a | o | | | | | | | | | | | o | o | o | | | | | | | |
| b | o | | | o | | | | | | | | o | o | o | | | | | | | |
| 2a | o | | | o | o | | | | | | | o | o | o | o | | | | | | |
| b | o | | | o | o | | | | | | | o | o | o | o | o | | | o | | |
| 3 | o | | | o | o | o | | | | | | o | o | o | o | o | o | | o | o | |
| 4a | o | | | o | o | | | | o | | | o | o | o | o | o | o | o | o | o | |
| b | o | | | o | o | | | | o | | | o | o | o | o | o | o | o | o | o | o |
| 5 | o | | | o | o | o | | | o | | | o | o | o | o | o | o | o | o | o | o |
| 6 | o | | | o | o | o | | | o | o | | o | o | o | o | o | o | o | o | o | o |
| 7 | o | | | o | o | | o | | o | o | | o | o | o | o | o | o | o | o | o | o |
| 8 | o | | | o | o | | o | o | | o | o | o | o | o | o | o | o | o | o | o | o |
| TRa | o | | | o | o | | | | | | | o | o | o | o | o | o | o | o | o | o |
| b | o | | o | o | o | | | | | | | o | o | o | o | o | o | o | o | o | o |
| c | o | | o | | o | | | | | | | o | o | o | o | o | o | o | o | o | o |
| d | o | o | o | | o | | | | | | | o | o | o | o | o | o | o | o | o | o |
| 9 | o | o | o | | o | | | | | | | o | o | o | o | o | o | o | o | o | o |
| 10 | o | o | o | | o | | | | o | | | o | o | o | o | o | o | o | o | o | o |
| 11 | o | o | o | | o | o | | | o | | | o | o | o | o | o | o | o | o | o | o |
| 12 | o | o | o | | o | o | | | o | o | | o | o | o | o | o | o | o | o | o | o |
| 13 | o | o | o | | o | | o | | o | o | | o | o | o | o | o | o | o | o | o | o |
| 14 | o | o | o | | o | | o | | | o | o | o | o | o | o | o | o | o | o | o | o |
| 15 | o | o | o | | o | | o | o | | o | o | o | o | o | o | o | o | o | o | o | o |

*Table II*

| Braking-Drum Points | M1 G1 | BR | Diesel-Operation Only GF, E, TH1, TH2, TH3, TH4 | R1 R2 | R 11 | R 12 | R 13 | R 21 | R 22 | R 23 |
|---|---|---|---|---|---|---|---|---|---|---|
| Off | o | | | | | | | | | |
| 1 | o | o | o | | | | | | | |
| 2 | o | o | o | o | | | | | | |
| 3 | o | o | o | o | o | | | o | | |
| 4 | o | o | o | o | o | o | | o | o | |
| 5 | o | o | o | o | o | o | o | o | o | o | ple-motor contactor G1, which shorts out the traction-motor No. 2 by connecting the positive No. 1 terminal 51+ to the positive No. 2 terminal 52+. The picking up of this ground-side multiple-motor contactor G1 automatically drops out the series or transition-contactor JR, and the dropping out of this series or transition-contactor JR automatically picks up a power-side multiple-motor contactor M1, which connects the No. 2 negative terminal 52— to the No. 1 negative terminal 51—.

For diesel-operation, the two traction-motors 1 and 2 are always connected in parallel. Two diesel-power relays P1 and P2 are energized, for connecting the negative generator-terminal P— to the negative No. 1 motor-terminal 51—, and for connecting the positive generator-terminal P+ to the positive No. 2 motor-terminal 52+, respectively. The series-switch JR is left deenergized, and the multiple-motor switches M1 and G1 are closed, to connect the two traction-motors 1 and 2 in parallel across the generator-terminals P— and P+. Speed-control for the traction-motors 1 and 2 is obtained simply by accelerating the diesel engine 27, and hence the generator G.

The following comments on the tables may be helpful.

For trolley-operation, the off-position of the main controller-drum energizes the two multiple-motor switches M1 and G1 in readiness for a braking-operation. The first drum-point, or first on-position of said main controller-drum, deenergizes these two multiple-motor switches M1 and G1, and energizes the line and ground trolley-connection switches LS and TG. Contingent upon the completion of the drop-out movement of one or both of the parallel-motor switches M1 and/or G1, the series-switch JR is energized, on this first on-position of the main drum, as indicated at 1b in Table I.

In order to avoid the necessity for opening the multiple-motor switches M1 and G1 under power-inrush conditions, the trolley-power switches LS and TG can be made slow enough, in picking up (as diagrammatically indicated by contact-retarding dashpots DP), to give the parallel-operation switches M1 and G1 time to get out first, if desired, or the same result could be accomplished by any other equivalent time-coordinating design-expedient.

The progressive cutting out of the accelerating-resistances, the transition from series to parallel operation, and the second gradual cutting out of the accelerating resistances, during successive controller-points of the trolley-operation, have already been described. The resistances can be cut out in many different kinds of sequences, and other control-combinations than those shown are also known to the art, and available for use with my present invention.

For diesel-operation, it is a significant feature of my present invention that the first four on-positions of the drum progressively cut out more and more of the accelerating-resistances. In this manner, I am enabled to use all or a portion of the accelerating-resistances as a cushion for permitting the diesel-powered operation of the traction-motors to commence sooner than would otherwise be possible, after a period of compressor-operation with a high speed of the diesel engine. The cushioning resistor makes it possible to initiate the diesel-operation of the traction-motors with the diesel-speed considerably higher than the idling speed, but with enough resistance in series with the traction-motors to reduce the initial starting-torque to any desired amount. In general, the order of cutting-out of progressive sections of the starting-resistances is different, for diesel-operation, than for trolley-operation.

In the particular form of embodiment of my invention which I have chosen for illustration, I use an expedient which I have used before, prior to my present invention, namely the expedient of using only one main master-controller drum, for both trolley and diesel-operation, and I use a changeover-switch CH, and suitable interlocking relay-connections, for causing different sequences of control-operations to be performed by the main master-controller drum, according to the position of the changeover-switch. I have shown the changeover-switch CH as a simple solenoid-operated relay, having a coil CH which is shown underneath the diesel engine 27, in the lower right-hand corner of the drawing. The deenergized position of the changeover relay CH corresponds to the normal trolley-operation, which is used on those portions of the track where trolley-power is available. Thus, the back-contacts of the changeover relay CH are closed during trolley-operation. To energize the changeover-switch CH for diesel-operation, a switch 56 is shown in series with the changeover coil CH, for energizing this relay and closing its normally open make-contacts, to prepare the connections for diesel-operation.

Because of these changeover-connections, involved in the particular circuits which I have shown for carrying out my invention, with a single main master-controller drum, the diesel-operation on the drum-points 2 and 4 involve an automatic sequence whereby, on point 2, the energization of the resistance-shunting contactor R1 is used to automatically pick up the energizations of the resistance-shunting contactors R11 and R21, and on point 4, the energization of the resistance-shunting contactor R13 pulls in the resistance-shunting contactor R23.

After point 5, during diesel-operation, as shown in Table I, the next six points of the main controller-drum operate the throttle-actuating solenoids TH1 to TH4 in such sequence as to advance the throttle-valve V of the diesel engine 27 in six successive steps, until the full-throttle position is reached, on point 11, after which this condition is held, and the controller is no longer effective to produce any further acceleration of the traction-motors during diesel-operation.

The braking-operation which is shown in Table II needs no further comment, except to point out that, in the off-posiiton of the braking-drum, the parallel-motor switches M1 and G1 are closed, and all other switches are open. The first on-position of the braking-drum picks up the braking-contactor BR, and also, in accordance with my present invention, it picks up the generator-field switch GF, the auxiliary battery-field switch E, for increasing the rate of voltage-buildup in the generator, and all four throttle-coils TH1 to TH4. The closure of the braking-switch BR immediately starts the braking-operation with all of the accelerating-resistances 45 to 48 in operation. The energization of the generator-field and the actuation of the diesel-engine throttle cause both the generator-voltage and the diesel-engine speed to pick up to their maximum values, as fast as possible, thus making available a suitable source of power-supply for the blower-motor B, so that the traction-motors 1 and 2 will not burn out during the braking-operation. Successive points on the braking-drum cut out the accelerating-resistances in successive steps in any desired order and magnitude, according to the requirements.

The essential features of my invention are shown in Tables I and II, as has been described above. The details for carrying out the novel operations of my invention are susceptible of considerable variation.

Solely by way of illustration, and without limiting myself to any one particular control-system, I have shown, in the top half of the drawing, schematically indicated control-circuits which will carry out the operations which have already been broadly described.

The master controller consists of two drums, namely an "on-off" drum, and a main drum, as indicated by suitable legends on the drawing. The "on-off" drum is usually a reversing drum, which reverses the polarity of the motor-fields F1 and F2 of the traction-motors 1 and 2. As the details of these reversing-connections are well known, and have nothing to do with my present invention, I have shown what would usually be the reversing drum, as simply an "on-off" drum, having two positions, off and on. In the off-position, this "on-off" drum deenergizes the master-controller, and this drum usually has a removable handle (not shown) which can be removed, and put in an appointed place, when the operator leaves the locomotive unattended, so as to prevent unauthorized manipulation of the controls. In the on-position, this "on-off" drum energizes two conductors, +1 and P11, from the positive bus (+).

The main drum of the master controller is shown as having an off-position, and fifteen successively numbered on-positions, not counting a transition-position or point TR, which is located between points 8 and 9. The main drum of the master controller is shown as having four stepped contact-segments 61, 62, 63 and 64, each receiving a different source of control-power.

The first contact-segment 61 receives its power from a lead TO, representing operation from the "trolley only," this lead being energized from the +1 conductor through a back-contact CH of the change-over switch or relay CH. In the off-position, and also on points TR through 15, of the main drum, said first contact-segment 61 makes contact with a conductor 7, while on points 1 through TR, said contact-segment makes contact with a conductor 6.

The conductor 7 leads to a conductor 65 through a back contact CH of the changeover switch, so as to energize said conductor 65 when the changeover switch is in its unenergized position, for trolley operation. This conductor 65 is also energized, during diesel-operation, by means of a make-contact CH of the change-over switch, which connects said conductor to the $+1$ control-circuit. The conductor 65 is connected to a second conductor 66, through back-contacts of the resistance-shorting switches R13 and R23. The last-named conductor 66 directly energizes the operating coil G1 of the ground-side multiple-motor switch G1. Said conductor 66 is also connected, through an interlocking back-contact JR of the transition or series-switch JR, to the operating coil M1 of the power-side multiple-motor switch M1.

The conductor 6 is used to energize the operating coil JR of the transition or series-switch JR, through an interlocking back-contact G1 of the ground-side multiple-motor switch G1.

The second contact-segment 62 of the main drum is used simply to energize a conductor 15 from the P11 control-circuit supply-line, when the main drum is in its off position.

The third contact-segment 63 of the main drum is energized from a control-circuit supply-line marked DO, representing operation from the "diesel only." There are two parallel sources of energization for the DO conductor, as indicated by the circuits 67 and 68, respectively. The first of these circuits, 67, energizes the DO conductor from the positive bus (+), through two interlocking make-contacts CH and P1, for energizing the DO conductor after the fourth contact-segment 64 has energized the diesel-power switch P1, in the first on-position of the main drum, as will be subsequently described.

The second energizing circuit 68, for the DO conductor, is for the purpose of energizing this DO conductor, under proper circumstances, when the main drum is on its off-position. This circuit 68 is connected to a circuit 422 through a make-contact CH of the changeover switch, and a back-contact P2 of the second diesel-power switch P2. The conductor 422 may receive its energization through two different circuits, first, through a circuit 69, which is energized from the P11 control-power conductor through the back contact PG of the pressure-gauge, indicating that the pressure is down in the compressed-air tank 36, and that an operation of the compressor-motor C is needed in order to drive the compressed-air pump P. The second source of energization for the conductor 422 comes from the braking controller, which will be subsequently described.

The aforesaid third contact-segment 63 of the main drum energizes all four throttle-controlling conductors TH1 to TH4, in the off-position of the main drum, whenever the DO control-circuit is energized. In the first five on-positions of the main drum, none of the throttle-control circuits is energized. In drum-positions 6 through 11, different combinations of the throttle-control circuits TH1 to TH4 are energized, corresponding to the throttle-controlling solenoids TH1 to TH4, so as to advance the diesel-engine throttle-valve V, in successive steps, from the idling position to the full-throttle position. On points 11 through 15 of the main drum, all of the throttle-controlling conductors T1 to T4 remain energized, assuming that the DO conductor is energized.

The last contact-segment 64 of the main drum is a speed-controlling segment, for energizing, and controlling the speed of, the two traction-motors 1 and 2. This fourth contact-segment 64 receives its energization from the supply-conductor $+1$. In the first on-position of the main drum, the segment 64 energizes a conductor marked $+1A$, which goes to the braking controller, and through an off-position segment 71 thereon, to conductor $+2A$, which is used to energize the traction-motors 1 and 2 from either the trolley-circuit 50 or the generator-terminals P— and P+, according as trolley-operation or diesel-operation is being used.

Thus, the conductor $+2A$ is connected to a trolley-operation wire 72 through a back-contact CH and a back-contact P1, to provide the necessary interlocks. The wire 72 directly energizes the ground-side trolley-operation switch TG, and through an interlock in the form of a back-contact BR of the braking switch BR this wire 72 also energizes the line-switch LS.

A second control-circuit 73, for diesel-operation, leads from the $+2A$ conductor through a make-contact CH and a back-contact LS, to provide the necessary interlocks. In accordance with my invention, it is not feasible, in general, to energize the diesel-power switches P1 and P2 from the wire 73 without any engine-speed or generator-voltage interlock, because of my provision for operating the diesel power-plant at its full speed on off-positions of the main drum, when the air-tank pressure-gauge PG calls for more air. Consequently, I use a back-contact V1 to connect the wire 73 to a wire 74, which in turn energizes the two diesel-power switches P1 and P2, and when the P2 switch is energized, a make-contact P2 of that switch is used to by-pass the V1 back-contact. The V1 back-contact is carried by an undervoltage relay V1 which is energized from the generator-terminals P— and P+.

On point 2 of the main drum, a conductor 10 is energized from the control-circuit $+1$, thus directly energizing the contactors R1 and R2 which short out the starting-resistors 45 and 47, respectively.

On other on-positions of the main drum, the contactor-segment 64 energizes various combinations of the conductors 11, 21, 12, 22, 13 and 23, which energize the correspondingly numbered resistor-shorting relays R11 to R23, as will now be described.

The precise points at which the various resistor-shorting switches are energized are shown in Table I. It will be noted that the main drum is used for the speed-control of the traction-motors 1 and 2 during both trolley-operation and diesel-operation, and that the order of control is different, for these two operations. The connections for these two operations will now be separately described.

For trolley-operation, the circuit 10 leads directly to the relays or contactors R1 or R2 as has already been mentioned; the conductor 11 leads to the contactor R11 through a back-contact CH, which energizes a conductor 11A which leads directly to the coil R11; the conductor 21 energizes the contactor R21 through another back contact CH, which energizes a conductor 21A which is directly connected to the coil R21; the conductors 12, 22 and 23 lead directly to the respective coils R12, R22 and R23; and the conductor 13 is connected, through a back-contact CH, to a conductor 13A which is directly connected to the coil R13.

For diesel-operation, various interlocks are provided, for changing the order of energization of the resistance-shorting relays R1 to R23. Thus, the conductor 10 is connected to the conductor 11A through a make-contact R1 and a make-contact P2. The conductor 11A is connected to the conductor 21A, through another make-contact P2. The conductor 11 is connected to the conductor 12 through a make-contact P2, and the conductor 12 is connected back to the conductor 11A through a make-contact R12 and a make-contact P2, so as to provide a hold-in circuit for by-passing the CH back-contact between the circuits 11 and 11A. The conductor 12 is connected to the conductor 22 through a make-contact P1. The conductor 21 is connected to the conductor 13A through a make-contact P1, and the conductor 13A is connected back to the conductor 21A through a make-contact R13 and a make-contact P1. The conductor 11A is connected to the conductor 23 through a make-contact R13 and a make-contact P1. The operations of these diesel-power interconnections are summarized in the diesel-operation part of Table I.

As shown in the drawing, a braking controller is provided, having an off-position, and five successively numbered on-positions. In the off-position, the previously mentioned contact-segment 71 effects a connection between the conductors +1A and +2A, as already described. In the various on-positions of the braking controller, a stepped contact-segment 79 of this controller makes various connections from the control-circuit 15, which comes from the off-position of the main drum, whence said control-circuit can be traced back, through the conductor P11, to the on-position of the on-off drum, and thus to the positive bus (+). The braking controller, in all of its on-positions numbered 1 to 5, energizes the previously described conductor 422, which energizes the "diesel-only" conductor DO for braking-operation, so as to energize all four throttle-solenoids TH1 to TH4, as shown in Table II. In all of said on-positions numbered 1 to 5, the braking controller also energizes a conductor 17, which energizes the braking contactor BR through suitable interlocks in the form of a back-contact LS and a back-contact P1. In its on-positions numbered 2 to 5, the stepped contact-segment 79 of the braking controller energizes different combinations of the conductors 10, 11, 21, 12, 22, 13A and 23, for controlling the resistance-shunting contactors R1 to R23 as shown in Table II.

Various controls are also provided for controlling the compressor-motor C and the blower-motor B. First, the main circuits for these motors will be traced. For trolley-operation, the negative compressor-motor terminal C— is connected to the trolley-conductor 50 through a compressor-to-line switch CL, while the positive compressor-motor terminal C+ is connected to ground through a combined blower and compressor ground-switch BCG.

During diesel-operation, there are two auxiliary-power diesel-operation switches D and D1: the switch D energizes the positive blower-motor terminal B+ from the positive generator-terminal P+, while the switch D1 energizes a conductor 80 from the negative generator-terminal P—.

When the compressor-motor C is to be energized from the diesel-driven generator G, a contactor CG is energized, which energizes the negative compressor-motor terminal C— from the conductor 80; and another contactor CC is energized, which connects the positive blower-motor terminal B+ to the positive compressor-motor terminal C+.

When the blower-motor B is to be energized from the diesel-driven generator G, the negative blower-motor terminal B— is connected to the conductor 80 through a contactor BG. When this blower-motor is to be energized from the trolley-wire 24, the negative blower-motor terminal B— is connected to the trolley supply-line 50 through a contactor BL.

The controls for the auxiliary diesel-power switches D and D1 are shown at the extreme bottom of the drawing, wherein a make-contact CH of the change-over switch is shown as energizing a conductor 81 from the positive bus (+). This conductor 81 energizes the two contactor-coils D and D1 in parallel, after which the circuit continues through a conductor 82, which is connected to the negative bus (—) through a back-contact BL and a back-contact BCG, providing the necessary interlocks.

The control-circuits for the other contactors for energizing the compressor-motor C and the blower-motor B are shown, in the drawing, underneath the main drum of the master controller. In the illustrated form of embodiment of my invention, neither the blower-motor B nor the compressor-motor C will operate successfully from the diesel-driven generator G when the latter is running at its idling speed. Hence, these motors cannot be energized from the generator G except when the throttle-controlling solenoids TH1 to TH4 are suitably energized for a satisfactorily advanced position of the throttle-valve V of the diesel engine 27.

For the control of the blower-motor's generator-operation contactor BG, I have accordingly shown, immediately under the main drum, a branch-circuit from the throttle-controlling conductor TH2, which energizes the BG coil through a make-contact CH and a make-contact D1, providing the necessary interlocks. This insures that the blower-motor B will not be energized, during diesel-operation, unless the main controller-drum has been advanced as far as point 7, during the motoring-operation of the traction-motors 1 and 2, or unless, in the off-position of the main drum, the "diesel-only" circuit DO is energized either from the pressure-gauge circuit 69, calling for more compressed air, or from the braking-controller circuit 422, calling for the use of the traction-motors 1 and 2 to provide braking-power for the locomotive. It will be understood, of course, that other, more elaborate controls for the blower-motor contactor BG could be used, but these are the controls which are shown in the simplified diagram which is included in the accompanying drawing, and these controls will suffice to illustrate the principles of my invention.

For energizing the compressor-motor C during diesel-operation, I use a control-circuit which is branched off from the high-speed throttle-controlling conductor TH4, which extends, through a make-contact CH, to a conductor 85. The conductor is connected to the operating coil CG of the compressor-motor's generator-operation contactor CG, after which a relaying circuit 86 is extended on, through the pressure-gauge back-contact PG, to the negative bus (—).

The circuit 85 is also connected, through an interlocking make-contact D, to the operating coil CC of the other compressor-motor contactor CC, the circuit of which is completed through the conductor 86.

For the trolley-operation of the compressor-motor C and the blower-motor B, I use a circuit 88, which comes from the positive bus (+) to a circuit 89, through a back-contact CC and a back-contact D. The circuit 89 is connected, through a back-contact CH of the changeover-switch, to the operating coil CL of the compressor-motor's line-switch CL, from which the relaying circuit continues through the conductor 86 and the PG back-contact, to the negative bus (−). The circuit 89 also directly energizes the operating-coil BCG of the combined blower and compressor ground-switch BCG; and through an interlocking back-contact BG, said circuit 89 also energizes the operating-coil of the line-terminal blower-actuating contactor BL.

The control-circuits for my illustrated apparatus are completed by an engine-starting pushbutton ST, which is shown near the diesel engine 27, immediately above the engine-shaft 29. This starting-pushbutton ST energizes the generator-starting contactors GS and GS1, which cause the generator G to start up as a series motor, energized from the battery 37.

The essential operation of the illustrated simplified form of embodiment of my invention is very well shown in Tables I and II, which have already been described. Any control-circuit details could be used, which will bring about the essential operation shown in the tables, or the substantial equivalent thereof, including any reasonable variations to meet the exigencies of any particular operating-conditions or voltages. While I have illustrated my invention in one particular illustrative form of embodiment, in a very simplified diagram, I wish it to be understood, therefore, that I do not consider my invention to be limited to these particular details, but I desire that the appended claims shall be given the broadest interpretation consistent with their language.

I claim as my invention:

1. A self-propelled two-power electric vehicle comprising, a traction-motor, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor when the latter is operating from either one of said power-supplies, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, a vehicle-borne compressed-air tank, a pressure-gauge for said tank, an air-pump for said tank, a compressor-motor for driving said pump, and compressor-controlling means responsive to a low-pressure condition of said pressure-gauge for energizing said compressor-motor from whichever power-supply is in use at the moment, said compressor-controlling means including means for making an adequate voltage effective on said compressor-motor to enable said compressor-motor to effectively drive said pump when the generator is the power-supply at the moment and when the controller-means is in either its off-position or in a predetermined on-position at the moment when compressor-motor operation is required.

2. A self-propelled two-power electric vehicle comprising, a tractor-motor, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor when the latter is operating from either one of said power-supplies, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, a vehicle-borne compressed-air tank, a pressure-gauge for said tank, an air-pump for said tank, a compressor-motor for driving said pump, said compressor-motor having a voltage-rating too high for satisfactory operation from said generator when the latter is running at its idling-speed, off-position engine-controlling means, operative when the controller-means is in its off-position and when the generator is running at its idling-speed as the power-supply in use at the moment, said off-position engine-controlling means being further operative in response to a low-pressure condition of said pressure-gauge for accelerating the engine to a speed suitable for energizing said compressor-motor from said generator, and compressor-controlling means responsive to a low-pressure condition of said pressure-gauge for energizing said compressor-motor from whichever power-supply is available at the moment.

3. A self-propelled two-power electric vehicle comprising: a traction-motor of a type requiring artificial cooling during certain heavy-duty conditions, a blower for supplying that cooling, a blower-motor for driving said blower, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor and for energizing said blower-motor as required, from whichever power-supply is in use at the moment, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, and braking-means for using said traction-motor for controllably braking the vehicle and for energizing the blower-motor as required, when either power-supply is in use, said controller-means and braking-means including means for making an adequate voltage effective on said blower-motor to enable said blower-motor to effectively drive said blower when the generator is the power-supply at the moment and when the controller-means is in either its off-position or in a predetermined on-position at the moment when blower-motor operation is required.

4. A self-propelled two-power electric vehicle comprising: a traction-motor of a type requiring artificial cooling during certain heavy-duty conditions, a blower for supplying that cooling, a blower-motor for driving said blower, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, said blower-motor having a voltage-rating too high for satisfactory operation from said generator when the latter is running at its idling-speed, a variable accelerating-resistor for said traction-motor, controller-means for controlling the motoring-speed of the traction-motor and for energizing said blower-motor as required, from whichever power-supply is in use at the moment, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, braking-means for using said traction-motor for controllably braking the vehicle and for energizing the blower-motor as required, when either power-supply is in use, and off-position engine-controlling means, operative when the controller-means is in its off-position and when the generator is running at its idling-speed as the power-supply in use at the moment, said off-position engine-controlling means being further operative in response to an on-position of said braking-means for accelerating the engine to a speed suitable for energizing said blower-motor from said generator.

5. A self-propelled two-power electric vehicle comprising: a traction-motor of a type requiring artificial cooling during certain heavy-duty conditions, a blower for supplying that cooling, a blower-motor for driving said blower, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor and for energizing said blower-motor as required, from whichever power-supply is in use at the moment, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, a vehicle-borne compressed-air tank, a pressure-gauge for said tank, an air-pump for said tank, a compressor-motor for driving said pump, compressor-controlling means responsive to a low-pressure condition of said pressure-gauge for energizing said compressor-motor from whichever power-supply is in use at the moment, said compressor-controlling means including means for making an adequate voltage effective on said compressor-motor to enable said compressor-motor to effectively drive said pump when the generator is the power-supply at the moment and when the controller-means is in either its off-position or in a predetermined on-position at the moment when compressor-motor operation is required, and braking-means for using said traction-motor for controllably braking the vehicle and for energizing the blower-motor as required, when either power-supply is in use, said controller-means and braking-means including means for making an adequate voltage effective on said blower-motor to enable said blower-motor to effectively drive said blower when the generator is the power-supply at the moment and when the controller-means is in either its off-position or in a predetermined on-position at the moment when blower-motor operation is required.

6. A self-propelled two-power electric vehicle comprising: a traction-motor of a type requiring artificial cooling during certain heavy-duty conditions, a blower for supplying that cooling, a blower-motor for driving said blower, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring speed of the traction-motor and for energizing said blower-motor as required, from whichever power-supply is in use at the moment, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, a vehicle-borne compressed-air tank, a pressure-gauge for said tank, an air-pump for said tank, a compressor-motor for driving said pump, said blower-motor and said compressor-motor each having a voltage-rating too high for satisfactory operation from said generator when the latter is running at its idling-speed, braking-means for using said traction-motor for controllably braking the vehicle and for energizing the blower-motor as required, when either power-supply is in use, off-position engine-controlling means, operative when the controller-means is in its off-position and when the generator is running at its idling-speed as the power-supply in use at the moment, said off-position engine-controlling means being further operative in response to an on-position of said braking-means for accelerating the engine to a speed suitable for energizing said blower-motor from said generator, said off-position engine-controlling means being still further operative in response to a low-pressure condition of said pressure-gauge for accelerating the engine to a speed suitable for energizing said compressor-motor from said generator, and compressor-controlling means responsive to a low-pressure condition of said pressure-gauge for energizing said compressor-motor from whichever power-supply is available at the moment.

7. A self-propelled two-power electric vehicle comprising, a traction-motor, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor when the latter is operating from either one of said power-supplies, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, said controller-means having an engine-accelerating contact which stands ready, when energized, to accelerate the engine in only the off-position of the controller-means when the generator is running at its idling-speed as the power-supply in use at the moment, means for at times energizing said engine-accelerating contact independently of said controller-means, and means for deenergizing the first on-position of said controller-means when the generator is the power-supply for the traction-motor, in response to an operative-condition in which the generator-voltage is in excess of a predetermined voltage.

8. A self-propelled two-power electric vehicle comprising, a traction-motor, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor when the latter is operating from either one of said power-supplies, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for varying the engine-speed when the traction-motor is operating from the generator, said controller-means having an engine-accelerating contact which stands ready, when energized, to accelerate the engine in only the off-position of the controller-means when the generator is running at its idling-speed as the power-supply in use at the moment, means for at times energizing said engine-accelerating contact independently of said controller-means, means for deenergizing the first on-position of said controller-means when the generator is the power-supply for the traction-motor, in response to an operative-condition in which the generator-voltage is in excess of a predetermined voltage, said predetermined voltage being higher than the idling-voltage of the generator, and means for using at least some of the accelerating-resistor in the traction-motor circuit when said first on-position is first energized as a result of a predetermined drop in the generator-voltage.

9. A self-propelled two-power electric vehicle comprising, a traction-motor, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor when the latter is operating from either one of said power-supplies, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for first successively cutting out said accelerating-resistor and then varying the engine-speed when the traction-motor is operating from the generator, said controller-means having an engine-accelerating contact which stands ready, when energized, to accelerate the engine in only the off-position of the controller-means when the generator is running at its idling speed as the power-supply in use at the moment, and means for at times energizing said engine-accelerating contact independently of said controller-means.

10. The invention as defined in claim 9, in combination with means for deenergizing one or more of the first resistor-varying on-positions of said controller-means when the generator is the power-supply for the traction-motor, in response to an operative-condition in which the generator-voltage is in excess of a predetermined voltage, said predetermined voltage being higher than the idling-voltage of the generator.

11. A self-propelled two-power electric vehicle comprising, a traction-motor, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor when the latter is operating from either one of said power-supplies, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for first successively cutting out said accelerating-resistor and then varying the engine-speed when the traction-motor is operating from the generator, said controller-means having an engine-accelerating contact which stands ready, when energized, to accelerate the engine in only the off-position of the controller-means when the generator is running at its idling-speed as the power-supply in use at the moment, a vehicle-borne compressed-air tank, a pressure-gauge for said tank, an air-pump for said tank, a compressor-motor for driving said pump, said compressor-motor having a voltage-rating too high for satisfactory operation from said generator when the latter is running at its idling-speed, means responsive to a low-pressure condition of said pressure-gauge for energizing said engine-accelerating contact, compressor-controlling means responsive to a low-pressure condition of said pressure-gauge for energizing said compressor-motor from whichever power-supply is available at the moment.

12. The invention as defined in claim 11, in combination with means for deenergizing one or more of the first resistor-varying on-positions of said controller-means when the generator is the power-supply for the traction-motor, in response to an operative-condition in which the generator-voltage is in excess of a predetermined voltage, said predetermined voltage being higher than the idling-voltage of the generator.

13. A self-propelled two-power electric vehicle comprising: a traction-motor of a type requiring artificial cooling during certain heavy-duty conditions, a blower for supplying that cooling, a blower-motor for driving said blower, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, said blower motor having a voltage-rating too high for satisfactory operation from said generator when the latter is running at its idling-speed, a variable accelerating-resistor for said traction-motor, controller-means for controlling the motoring-speed of the traction-motor and for energizing said blower-motor as required, from whichever power-supply is in use at the moment, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for first successively cutting out said accelerating-resistor and then varying the engine-speed when the traction-motor is operating from the generator, said controller-means having an engine-accelerating contact which stands ready, when energized, to accelerate the engine in only the off-position of the controller-means when the generator is running at its idling-speed as the power-supply in use at the moment, braking-means for using said traction-motor for controllably braking the vehicle and for energizing the blower-motor as required, when either power-supply is in use, and means responsive to an on-position of said braking-means for energizing said engine-accelerating contact.

14. The invention as defined in claim 13, in combination with means for deenergizing one or more of the first resistor-varying on-positions of said controller-means when the generator is the power-supply for the traction-motor, in response to an operative-condition in which the generator-voltage is in excess of a predetermined voltage, said predetermined voltage being higher than the idling-voltage of the generator.

15. A self-propelled two-power electric vehicle comprising: a traction-motor of a type requiring artificial cooling during certain heavy-duty conditions, a blower for supplying that cooling, a blower-motor for driving said blower, a connection-means adapted to energize said vehicle from an external electrical power-supply line when such a line is available, a variable-speed vehicle-borne engine, a generator which is driven by said engine for providing an alternative power-supply for said vehicle, the rated voltage of said connection-means being materially higher than the voltage of the generator when the latter is running at its idling-speed, a variable accelerating-resistor for said traction-motor, controller-means for controlling the motoring-speed of the traction-motor and for energizing said blower-motor as required, from whichever power-supply is in use at the moment, said controller-means having an off-position in which said traction-motor is deenergized, and a plurality of on-positions in which the traction-motor is energized at controlled speeds, said controller-means including on-position means for varying said accelerating-resistor when the traction-motor is operating from the external power-supply and including on-position means for first successively cutting out said accelerating-resistor and then varying the engine-speed when the traction-motor is operating from the generator, said controller-means having an engine-accelerating contact which stands ready, when energized, to accelerate the engine in only the off-position of the controller-means when the generator is running at its idling-speed, as the power-supply in use at the moment, a vehicle-borne compressed-air tank, a pressure-gauge for said tank, an air-pump for said tank, a compressor-motor for driving said pump, said blower-motor and said compressor-motor each having a voltage-rating too high for satisfactory operation from said generator when the latter is running at its idling-speed, braking-means for using said traction-motor for controllably braking the vehicle and for energizing the blower-motor as required, when either power-supply is in use, means responsive to an on-position of said braking-means for energizing said engine-accelerating contact, means responsive to a low-pressure condition of said pressure-gauge for energizing said engine-accelerating contact, and compressor-controlling means responsive to a low-pressure condition of said pressure-gauge for energizing said compressor-motor from whichever power-supply is available at the moment.

16. The invention as defined in claim 15, in combination with means for deenergizing one or more of the first resistor-varying on-positions of said controller-means when the generator is the power-supply for the traction-motor, in response to an operative-condition in which the generator-voltage is in excess of a predetermined voltage, said predetermined voltage being higher than the idling-voltage of the generator.

MANLEY C. POTTER.

REFERENCES CITED

The following references are of record in the file of this patent:

UNITED STATES PATENTS

| Number | Name | Date |
| --- | --- | --- |
| 1,919,181 | Cutler | July 18, 1933 |
| 2,113,207 | Yingling | Apr. 5, 1938 |
| 2,210,675 | Kother | Aug. 5, 1940 |
| 2,276,812 | Webb et al. | Mar. 17, 1942 |
| 2,366,029 | Hines | Dec. 26, 1944 |

FOREIGN PATENTS

| Number | Country | Date |
| --- | --- | --- |
| 395,419 | Great Britain | July 20, 1933 |